United States Patent

Bunker et al.

[15] 3,680,054

[45] July 25, 1972

[54] INPUT/OUTPUT CHANNEL

[72] Inventors: William H. Bunker, Rochester; John W. Kerr, Byron; Nicholas S. Mitrofanoff; Kent W. Swearingen, both of Rochester, all of Minn.

[73] Assignee: International Business Machines Corporation, Armonk, N.Y.

[22] Filed: July 6, 1970

[21] Appl. No.: 52,488

[52] U.S. Cl. .......................................................... 340/172.5

[51] Int. Cl. .......................................................... G06f 9/18

[58] Field of Search ................................ 340/172.5; 235/157

[56] References Cited

UNITED STATES PATENTS

| | | | |
|---|---|---|---|
| 3,399,384 | 8/1968 | Crockett et al. | 340/172.5 |
| 3,311,055 | 7/1967 | Betz et al. | 340/172.5 |
| 3,543,242 | 1/1970 | Adams et al. | 340/172.5 |
| 3,408,632 | 10/1968 | Havck | 340/172.5 |
| 3,559,184 | 1/1971 | Rawlings et al. | 340/172.5 |
| 3,566,365 | 2/1971 | Rawson et al. | 340/172.5 |
| 3,297,994 | 1/1967 | Klein | 340/172.5 |
| 3,395,394 | 7/1968 | Cottrell | 340/172.5 |
| 3,407,387 | 10/1968 | Looschen et al. | 340/172.5 |
| 3,314,051 | 4/1967 | Willcox et al. | 340/172.5 |
| 3,333,252 | 7/1967 | Shimabukuro | 340/172.5 |

*Primary Examiner*—Paul J. Henon
*Assistant Examiner*—Mark Edward Nusbaum
*Attorney*—Keith T. Bleuer, Carl W. Laumann, Jr. and J. Jancin, Jr.

[57] ABSTRACT

The invention relates to a unique input/output channel used in a data processing system. The channel couples a plurality of external devices and their control units to a central processing unit. The configuration of the channel is such that it allows each of the control units direct control over many of the central processing unit functions during an input/output cycle. It allows each of the control units to share the system's main storage and central processing unit during these cycles. The design further allows for local store registers located in the central processing unit to be used as address registers for the external devices.

10 Claims, 11 Drawing Figures

INVENTORS
WILLIAM H. BUNKER
JOHN W. KERR
NICHOLAS S. MITROFANOFF
KENT W. SWEARINGEN
BY
Sughrue, Rothwell, Mion, Zinn & Macpeak
ATTORNEYS

REQUEST BUS IN LINE DEFINITION

| PRIORITY REQUEST | I/O ATTACHMENT | CYC. STEAL REQ. LINE | CLOCK TIME |
|---|---|---|---|
| 1 | A | 3 | 7 |
| 2 | B | 4 | 7 |
| 3 | C | 5 | 7 |
| 4 | D | 6 | 7 |
| 5 | E | 7 | 7 |
| 6 | F | 3 | 5 |
| 7 | G | 4 | 5 |
| 8 | H | 5 | 5 |
| 9 | I | 6 | 5 |
| 10 | J | 7 | 5 |
| 11 | K | 3 | 3 |
| 12 | L | 4 | 3 |
| 13 | M | 5 | 3 |
| 14 | N | 6 | 3 |
| 15 | O | 7 | 3 |
| 16 | P | 3 | 1 |
| 17 | Q | 4 | 1 |
| 18 | R | 5 | 1 |
| 19 | S | 6 | 1 |
| 20 | T | 7 | 1 |

| PRIORITY REQUEST | I/O ATTACHMENT | DATA BUS OUT LINES 72 | | | | | | | | |
|---|---|---|---|---|---|---|---|---|---|---|
| | | P | 0 | 1 | 2 | 3 | 4 | 5 | 6 | 7 |
| 1 | A | 0 | 0 | 0 | 0 | 1 | 0 | 0 | 0 | 0 |
| 2 | B | 0 | 0 | 0 | 0 | 0 | 1 | 0 | 0 | 0 |
| 3 | C | 0 | 0 | 0 | 0 | 0 | 0 | 1 | 0 | 0 |
| 4 | D | 0 | 0 | 0 | 0 | 0 | 0 | 0 | 1 | 0 |
| 5 | E | 0 | 0 | 0 | 0 | 0 | 0 | 0 | 0 | 1 |
| 6 | F | 1 | 1 | 0 | 0 | 1 | 0 | 0 | 0 | 0 |
| 7 | G | 1 | 1 | 0 | 0 | 0 | 1 | 0 | 0 | 0 |
| 8 | H | 1 | 1 | 0 | 0 | 0 | 0 | 1 | 0 | 0 |
| 9 | I | 1 | 1 | 0 | 0 | 0 | 0 | 0 | 1 | 0 |
| 10 | J | 1 | 1 | 0 | 0 | 0 | 0 | 0 | 0 | 1 |
| 11 | K | 1 | 0 | 1 | 0 | 1 | 0 | 0 | 0 | 0 |
| 12 | L | 1 | 0 | 1 | 0 | 0 | 1 | 0 | 0 | 0 |
| 13 | M | 1 | 0 | 1 | 0 | 0 | 0 | 1 | 0 | 0 |
| 14 | N | 1 | 0 | 1 | 0 | 0 | 0 | 0 | 1 | 0 |
| 15 | O | 1 | 0 | 1 | 0 | 0 | 0 | 0 | 0 | 1 |
| 16 | P | 1 | 0 | 0 | 1 | 1 | 0 | 0 | 0 | 0 |
| 17 | Q | 1 | 0 | 0 | 1 | 0 | 1 | 0 | 0 | 0 |
| 18 | R | 1 | 0 | 0 | 1 | 0 | 0 | 1 | 0 | 0 |
| 19 | S | 1 | 0 | 0 | 1 | 0 | 0 | 0 | 1 | 0 |
| 20 | T | 1 | 0 | 0 | 1 | 0 | 0 | 0 | 0 | 1 |

CYCLE STEAL ASSIGNMENT CODES ON DATA BUS OUT

INPUT/OUTPUT CHANNEL

BACKGROUND OF THE INVENTION

Field of the Invention

The invention is in the field of computers, and more specifically in the field of providing communication links between a central processing unit and external control units.

The invention is concerned with a unique input/output (I/O) channel. An I/O channel is broadly defined as a path including devices and logic along which signals are sent for bringing data into and out of a computer. Such devices are generally connected to and provide communication links between external devices and the computer's central processing unit (hereinafter referred to as CPU). Normally, numerous of these external devices are associated with the single CPU. Control of each of the devices is effected by a separate input/output attachment, also known as a control unit, coupled between the I/O channel and the device. One example of such an input/output device is a printer. As is known in the art, lines of print may be stored in the main storage of the computer. During an input/output cycle, under the control of an input/output attachment coupled to the printer, the lines of print may be read out and printed. An input/output cycle which is also called a cycle steal is a CPU cycle granted an input/output attachment.

SUMMARY OF THE INVENTION

The relationship between the I/O channel of this invention, the CPU and main storage of the computer and the I/O attachments and their respective I/O devices is shown in FIG. 1. The I/O channel accepts three banks of lines, each bank consisting of a plurality of channel input and output lines. Although three banks of lines are described, the number of banks may be fewer or greater. The channel input lines include a plurality of buses carrying data, cycle steal requests, and address codes for addressing portions of the CPU as well as a plurality of control lines carrying information from the attachments to the CPU. The channel output lines include a bus for carrying data from the CPU to the attachments as well as control lines for transferring timing information from the CPU to the attachments. Three banks are used in lieu of a single bank because of timing problems which would occur if a single bank was extended indefinitely, coupling all the attachments thereto. Because, as will be explained, the channel is time dependent, the time it takes for a signal to travel between the channel and an attachment is critical. Thus, the maximum distance at which an attachment may be placed from the channel is limited. Additionally, the dc resistance of the lines will have an adverse effect on the operation of the system if the line is too long. Therefore, in order to accommodate more attachments, the channel is designed to accept three banks of input and output lines. Each of these banks is identical and therefore only one is described in detail.

The I/O channel input lines and output lines of bank A are connected to the I/O attachments 1 . . . *n* in a configuration known in the art as a daisy chain. Each of these attachments control a corresponding I/O device 1 . . . *n*. A feature of the invention, as will be explained allows for such a connection of the I/O attachments. A daisy chain arrangement has the advantage that a minimum number of cable lines can be used in connecting the I/O attachments to the CPU through the channel. In brief, the channel allows for such a connection by a unique means which receives the I/O cycle or cycle steal requests and on the basis of a preassigned priority grants an I/O cycle to the highest priority attachment while notifying it of the granting by placing a code on a common bus which is sampled several times during a machine cycle. The apparatus for accomplishing this aspect of the invention and the operation thereof is fully disclosed below.

A further unique aspect of the I/O channel of this invention is its ability to provide means for the I/O attachments to share the computer's main storage and CPU during I/O cycles. This allows the I/O attachments to use the arithmetic and logic unit of the CPU for numerous functions. For example, under the control of a particular I/O attachment, the arithmetic and logic unit (ALU) may be used to update I/O address registers located in the CPU during an I/O cycle. The I/O address registers, as is known, are used to address particular storage locations in the main storage containing the instructions or data necessary to accomplish an I/O cycle. More generally, the ALU, through the channel, is capable of any ALU operation, such as add, subtract, AND, OR, all under the control of an I/O attachment, with the ALU output being available on the channel's output data bus. The sharing capability provided by the I/O channel further allows CPU timing to be used by both the I/O channel and I/O attachments. Thus, the same clock signals that control the CPU may also be used to control the I/O attachments. The advantage of this of course is that only one clock is needed for the entire system which eliminates the need for maintaining synchronism of separate clocks.

This sharing capability is accomplished, in part, by selection logic circuits contained in the channel. These circuits select the address register in the CPU specified by the I/O attachments. In addition, to assure that only one address register is selected at a time, unique checking circuits are provided as part of the selection logic which signals the CPU to block the selection if more than one register is indicated by the attachments.

These and other advantages of the I/O channel and the means by which these advantages are realized will become more apparent with the detailed description of the preferred embodiment of the invention.

DETAILED DESCRIPTION OF THE PREFERRED EMBODIMENT

Figure 1:
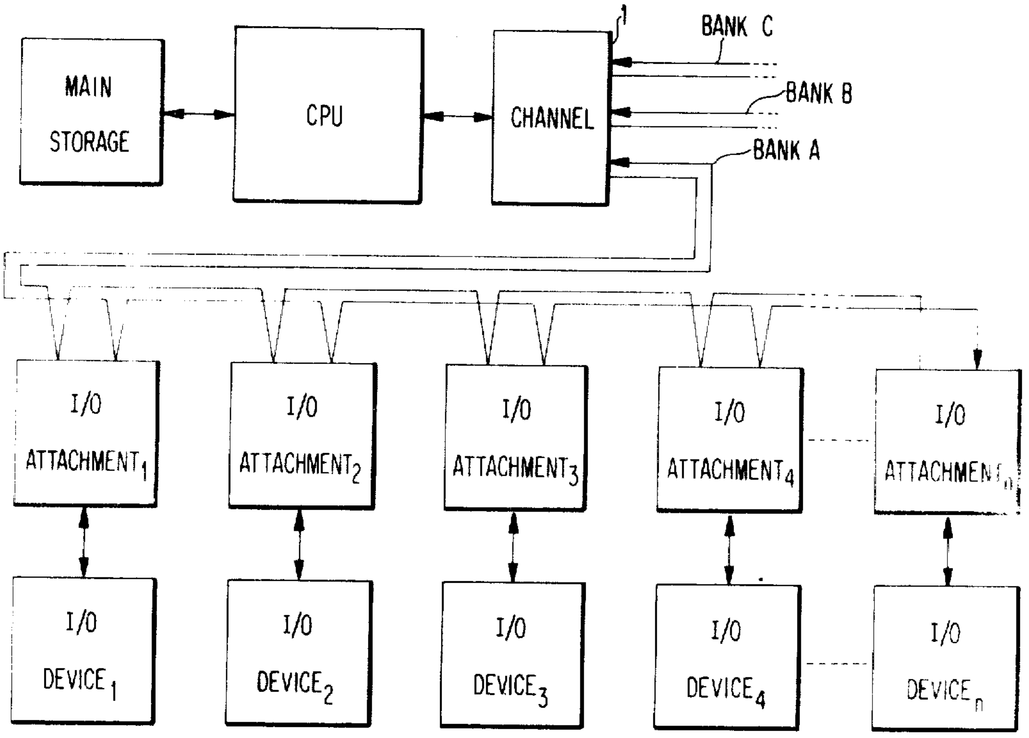
FIG. 1 is a diagram showing the relationship between the I/O channel of this invention, three banks of channel input and output lines, a CPU and a main storage.
Figure 2A:
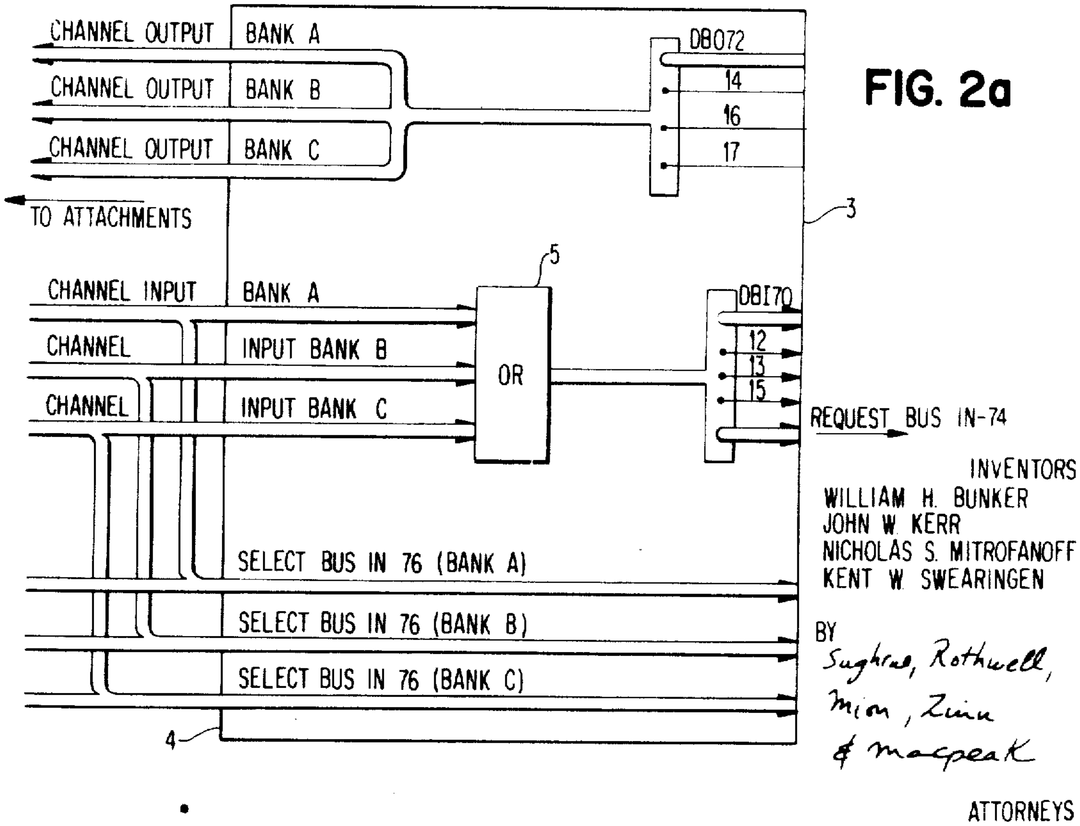
FIG. 2*a* shows that portion of the channel between interfaces 3 and 4 shown in FIG. 2.
Figure 2:
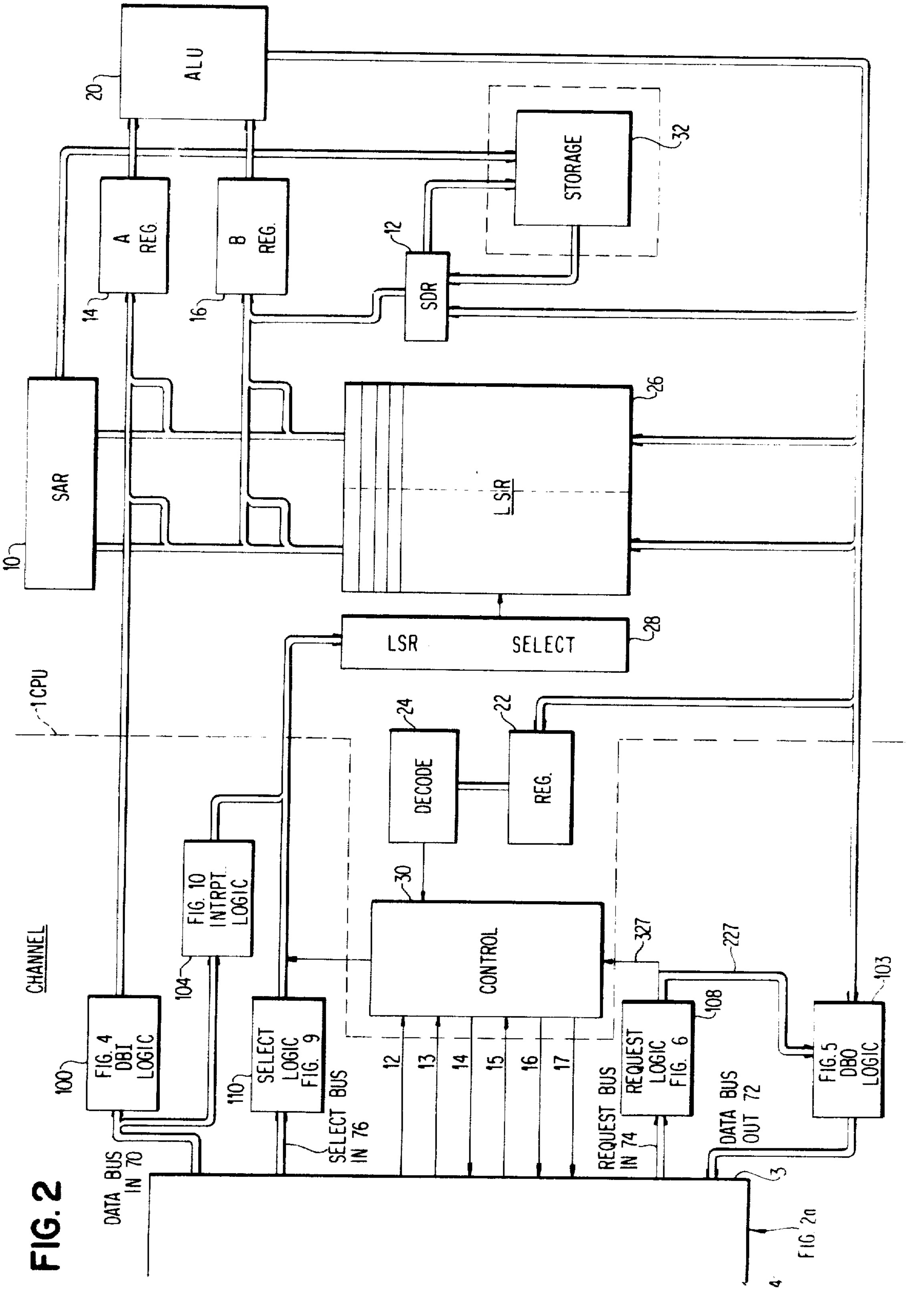
FIG. 2 is a block diagram of the structure of the I/O channel of this invention and its relationship to a CPU which may be used with the channel.

FIG. 2 includes functional block diagrams of the CPU which may be used with the channel of this invention, showing its relationship thereto. Dotted line 1 shows the interface between the CPU and the channel.

Although the CPU is known in the art and its particular construction is not the inventive feature described herein, a brief description of the CPU will be given to provide a better understanding of its association with the invention described herein.

The registers in the CPU are grouped generally into two categories, local store registers (LSR) and general registers. The general registers consist of storage address register 10, storage data register 12, B register 16, A register 14, and register 22. Register 22 stores instruction codes obtained from the main storage through registers 12 and 16 and the arithmetic and logic unit 20. These instructions are decoded in decoder 24 to determine which instruction the machine should execute. When an I/O instruction is decoded, the I/O attachments receive the information through signal lines traveling through the channel from the control logic 30.

In addition to the lines which carry the decoded instructions, additional lines are needed to carry other control information between the CPU and the attachments. These lines are represented by lines 12–17 in FIG. 2 and as shown pass uninterrupted through the channel. The showing of six lines is not to be interpreted as limiting the number of lines and as understood by those skilled in the art any number of such lines may be used.

The storage address register 10 stores the address of the data in main storage which will be read out through the storage data register 12 to the B register 16. Register 16 serves as a buffer for data bytes which are passed through the ALU 20. Where a data byte in the B register is to be modified, modifying data is contained in the A register 14. The contents of the A and B registers can then be gated into the ALU 20 and there modified. During input/output cycles, the A register which accepts data from the I/O channel is under the control of the I/O attachments through the channel. This will be described in detail below.

The local store registers 26 include address registers to be used by the I/O attachments. Each of the I/O attachments, having a cycle steal capability, i.e., the capability of requesting an I/O cycle, is assigned at least one of the registers in LSR 26 to retain the address in the main storage which will store or receive data for the attachment. The selection of the particular local store register by the attachment is performed through the I/O channel of this invention.

A control unit 30 contains the CPU controls operable in a manner well known to those skilled in the art. These controls control the CPU timing.

Included in FIG. 2 is a block diagram of the elements which comprise the I/O channel.

The portion of the channel shown left of interface 3, the details of which are shown in FIG. 2*a*, contains that section of the channel which accepts the three banks of channel input and output lines. The channel input lines from banks A, B and C, except the SELECT BUS IN 76, form inputs to OR gate 5. Gate 5 represents a plurality of OR gates, each receiving corresponding lines from the three banks. The bus 76 from each bank passes directly through the portion of the channel shown in FIG. 2a to three corresponding selection logic circuits, only one of which, SELECT logic 110, is shown in FIG. 2.

The channel output lines, one set for each bank, flare out from a single set of output lines derived from the DATA BUS OUT 72, and lines 14, 16 and 17. Any known means may be used for coupling the signals on the single set of output lines to the three sets of output lines. Additionally, where necessary, line drivers (not shown), as known in the art, may be used on the three sets of output lines to compensate for power loss caused by the division of the signals from one to three lines.

Looking to the right of interface 3, in FIG. 2, the channel includes three buses corresponding to buses of the channel input lines as shown in FIG. 2*a*, carrying information into the channel from the various I/O attachments. The first of these is the DATA BUS IN (DBI) 70 which carries the data to the main storage unit 32. This data flows through a DBI logic circuit 100 which includes a translator to the A register 14 of the CPU. As previously disclosed, the data then passes through the ALU 20 and the storage data register 12 to the main storage 32.

An interrupt logic network 104 is coupled between the DBI 70 and the LSR selection logic 28 in the CPU. This interrupt logic, operating in a manner to be described, stores interrupt requests for interrupting the CPU operation. As is known, some of the attachments perform functions such that when program service is required, it is required within a very short period of time. For the purpose of alerting the program of these needs, the channel must provide means for interrupting the CPU. This is precisely the function of the interrupt logic 104.

The SELECT BUS IN 76, three of which are contained in the channel, brings in instructions for addressing LSR 26 and stores them in SELECT LOGIC 110. SELECT LOGIC 110 provides a unique scheme for selecting particular local store registers and permits checking to determine that only one register has been selected at any point in time.

The REQUEST BUS IN 74 and the REQUEST LOGIC 108 provide means by which the attachments request cycle steals from the CPU. The request logic 108 provides a means for updating these requests on the basis of a preassigned priority in a time dependent mode. In this manner, all I/O attachments can operate simultaneously, requesting an I/O cycle, a particular attachment being assigned an I/O cycle in the order of its preassigned priority. The manner in which the cycle steal requests are granted and the manner in which the priority assignments are made, will be described below with the description of the circuitry of the request logic 108.

The DATA BUS OUT (DBO) 72 is coupled through DBO logic 103, which includes a translator, to the CPU. In addition, the output of the request logic 108 is coupled to both the control unit 30 and DBO logic 103. When a cycle steal request has been granted for a particular input/output device, that device is notified that it has been granted a cycle steal by means of the DBO 72.

With the I/O channel described above, the following advantages are obtained:

The channel, operating in a time dependent mode, permits I/O devices to be connected in a daisy chain array with all devices operating simultaneously.

Counters and other arithmetic units, ordinarily needed in I/O devices, may be eliminated because the novel I/O channel permits the I/O devices to share the CPU and main storage during I/O cycles.

Also, since the local store registers can be shared, the I/O attachments need not be equipped with address registers. This eliminates the need for address buses normally necessary to connect the attachment's address registers through the channel to the CPU.

The inclusion of the translators in the channel itself allows for multiple usage of the translator by several of the I/O attachments, thus saving translator cost.

Figure 3:
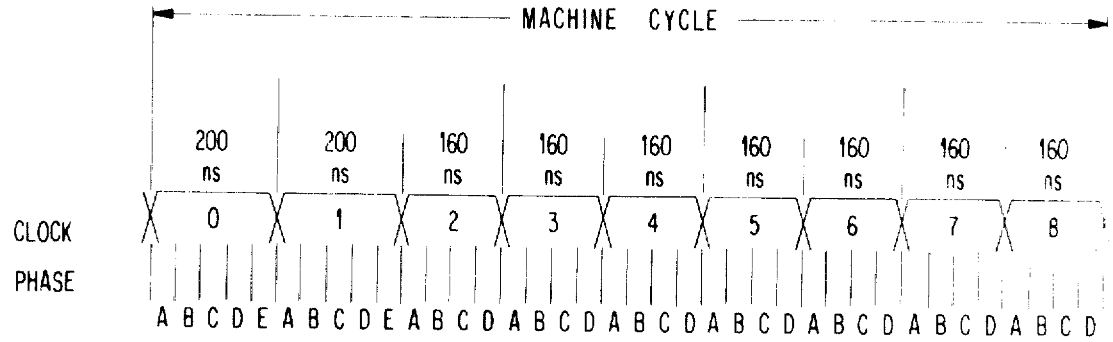
FIG. 3 is a diagram of the machine cycle of the CPU which may be used with the invention.

For the purposes of illustration only, operation of the input/output channel will be described in relation to a CPU operating with a machine cycle as shown in FIG. 3. This cycle is comprised of nine clock pulses, 0 through 8. Each clock is further divided into phases, each phase lasting for forty nanoseconds. Thus, clocks 0 and 1, which last 200 nanoseconds each, can be broken up into five phases each, A through E, while clocks 2 through 8, each 160 nanoseconds long, can be broken up into four phases each, A through D. The fact that clocks 0 and 1 are longer than the remaining clocks is dictated by the speed of the main storage. The machine cycle times will be described using clock and phase designations. For example, an operation may be described as beginning at a machine cycle time corresponding to time 7B and ending at time 0C. It is understood by those skilled in the art that the machine cycle timing illustrated in FIG. 3 is only representative and it is not intended that the invention be limited to operation in a system having identical cycle timing.

For a full understanding of the channel and its operation, a detailed description of each element which comprises the channel and its function and operation will now be described.

DATA BUS IN (DBI)

Figure 4:
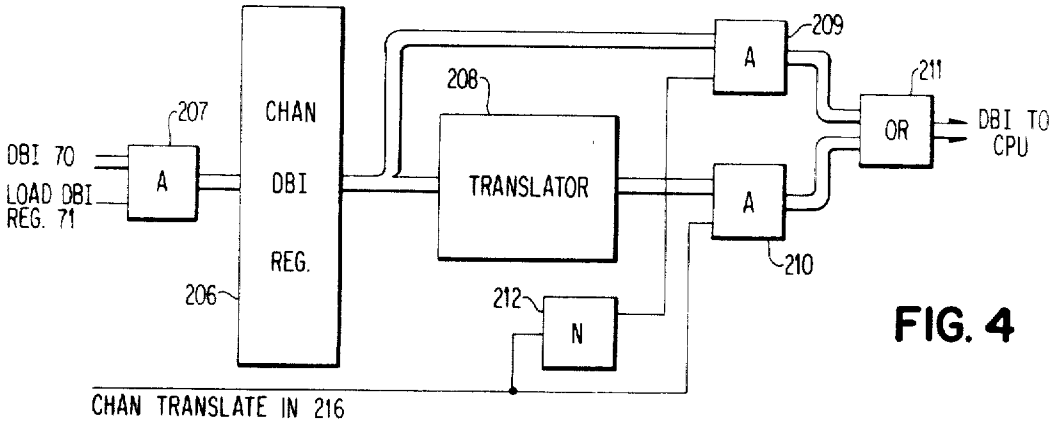
FIG. 4 is a representation of the I/O channel's data bus in and its associated logic.

The channel DATA BUS IN (DBI) 70 and its associated logic 100 are shown in FIG. 4. DBI 70 consists of nine lines which are used to transmit information, such as data interrupt requests and address modifications from the input/output attachments to the CPU. Eight of the lines carry information bits to form an eight bit information byte with the ninth bit used as a parity bit. AND gate 207 represents nine AND gates, one for each line of the bus 70. These gates are enabled by raising the LOAD DBI REG line 71. This line is terminated at its other end in the CPU. When an I/O cycle has been granted to an attachment and data is to be transferred into the CPU, the CPU raises line 71, enabling gate 207. In the operation of the preferred embodiment of the invention with the CPU previously described, this is done on the even numbered clock pulses. The outputs of the AND gates 207 are connected to the inputs of a data register 206 which retains the data information on bus 70. The output of the register 206 is fed through logic circuitry to the A register 14 of the CPU.

As is known in the art, it is often the case that input data must be translated into a code usable by the CPU. For this reason, translator 208 is included in the channel. The inclusion of the translator 208 in the channel, rather than in the I/O attachments, allows for one translator to be used by all of the I/O attachments thereby decreasing the cost of the system.

However, in some cases, no translation is required and the data from the register 206 must be transferred directly to the CPU without passing through the translator. For this reason, logic circuitry comprising AND gates 209 and 210, inverter 212, and OR gate 211 is included in the DBI. As with the representation of AND gate 207, AND gates 209 and 210 each represent a series of nine AND gates, one associated with each of the nine lines of DBI 70. Similarly, OR gate 211 represents nine OR gates associated with the nine lines of DBI 70. When the data in register 206 need not be translated, the CHAN TRANSLATE IN line 216 is held at a logic 0, thereby enabling AND gates 209 through inverter 212. This allows for the passage of the data stored in register 206 through OR gates 211 to the CPU. However, due to the logic 0 condition of line 216, AND gates 210 are disabled, thereby blocking the flow of data through the translator 208.

When a translation operation is required, line 216 is raised to a logic 1 which enables AND gates 210 while disabling AND gates 209. In this manner, the data stored in register 206 is transferred to the CPU through the translator 208, AND gates 210 and OR gates 211.

The state of the line 216 is controlled by the attachments. Translator 208 may be any known translator and specifically may be a translator which converts a 96-column card code to an extended binary coded decimal interchange code (EBCDIC).

DATA BUS OUT (DBO)

Figure 5:
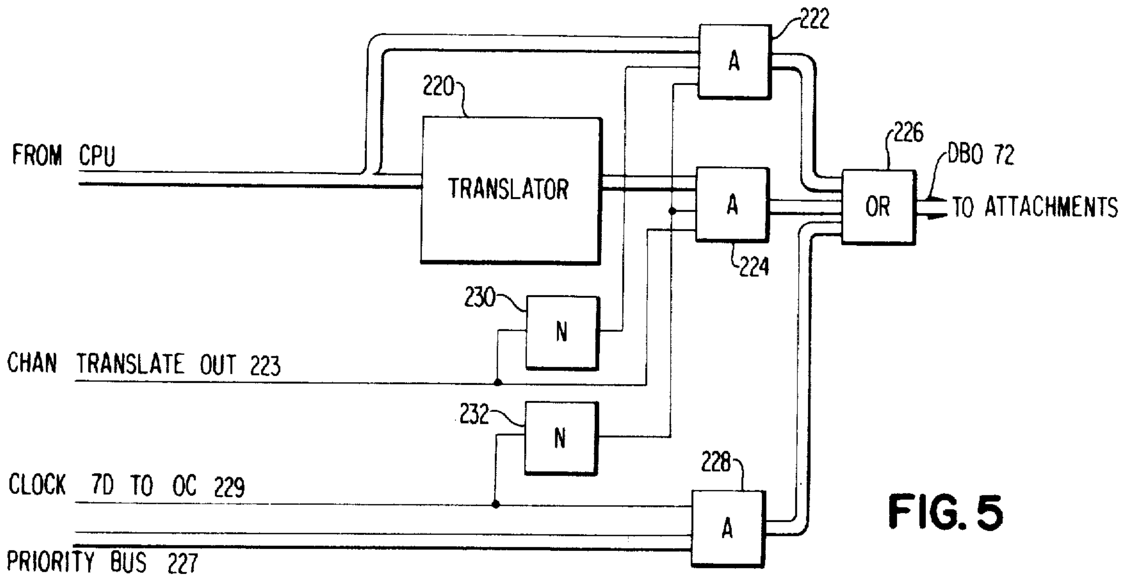
FIG. 5 is a representation of the I/O channel's data bus out and its associated logic.

The DATA BUS OUT (DBO) 72 and its associated logic 103 are shown in FIG. 5. As with DBI 70, the bus 72 consists of nine lines carrying eight information bits and a parity bit. Translator 220 in any given system corresponds to translator 208. Again, means are provided for the passage of data, either directly through the channel or, alternatively, through the translator 220. The logic necessary for such selective passage of data comprises AND gates 222 and 224 and inverter 230. AND gates 222 and 224 each represent a series of nine AND gates, one associated with each of the DBO 72 lines. A CHAN TRANSLATE OUT line 223 is provided to selectively pass the data from the CPU through the translator 220. Line 223 is terminated at its other end in the attachments. With CHAN TRANSLATE OUT line 223 in a logic 0 condition, AND gates 222 are enabled through inverter 230, thereby providing a path for the data to OR gate 226. OR gate 226 represents a series of nine OR gates, one associated with each of the lines of bus 72. With line 223 in a logic 0 state, AND gates 224 are disabled, thereby blocking the passage of data through the translator 220. The raising of line 223 to a logic 1 disables gates 222, while enabling gates 224, thereby allowing for the passage of data through the translator 220. The outputs of OR gates 226 are fed to the I/O attachments by means of DBO 72.

The DBO of this invention accomplishes the additional function of notifying the I/O attachments of the assignment of I/O cycles. As has been previously disclosed, the assignment is done on a priority basis, incorporating a time dependent technique. This technique and the circuitry for effecting it is disclosed below. However, for the understanding of DBO 72, its logic 103 and its relationship to the I/O cycle request circuitry 108, it is sufficient to note that the information carried by PRIORITY BUS 227 identifies the I/O attachment awarded the next I/O cycle. The I/O attachments determine which one will receive the next I/O cycle by interrogating DBO 72 during specified times. During the time that the attachments interrogate DBO 72 other data must not flow through the bus 72. Thus, a third input is provided to AND gates 222 and 224 for disabling these gates during selected times. As an example, in the case of a channel operating in accordance with a machine cycle disclosed above, (FIG. 3) these gates may be disabled, during clocks 7D through 0C of a machine cycle, by raising line 229 to a logic 1. Simultaneously, AND gate 228 is enabled to pass the I/O cycle information to the attachments. Gate 228 represents nine gates, one coupled to each of the nine lines which comprise priority bus 227.

REQUEST BUS IN

Figure 6:
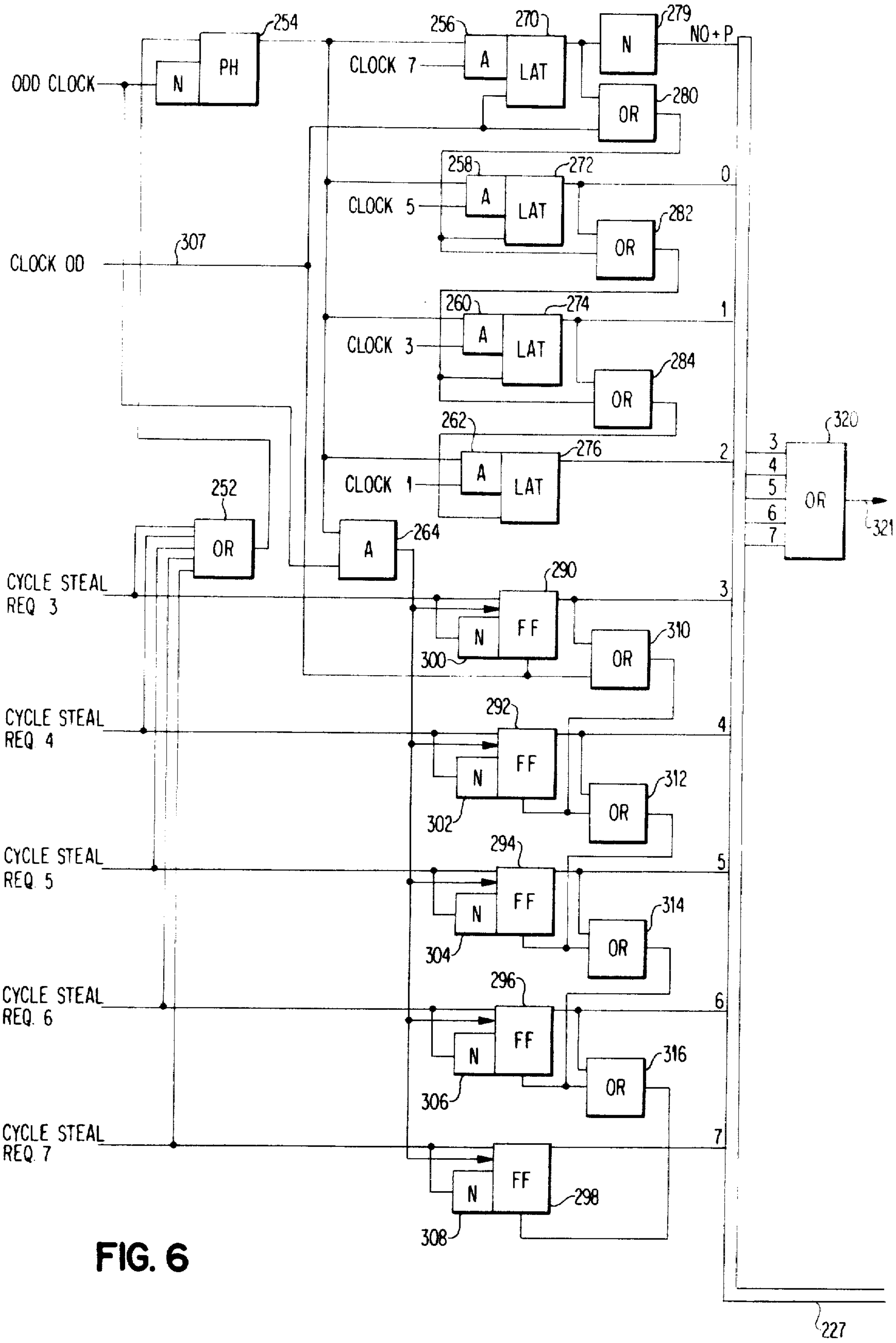
FIG. 6 is a diagram of the I/O attachment priority selection logic contained in the channel.
Figures 7, 9:
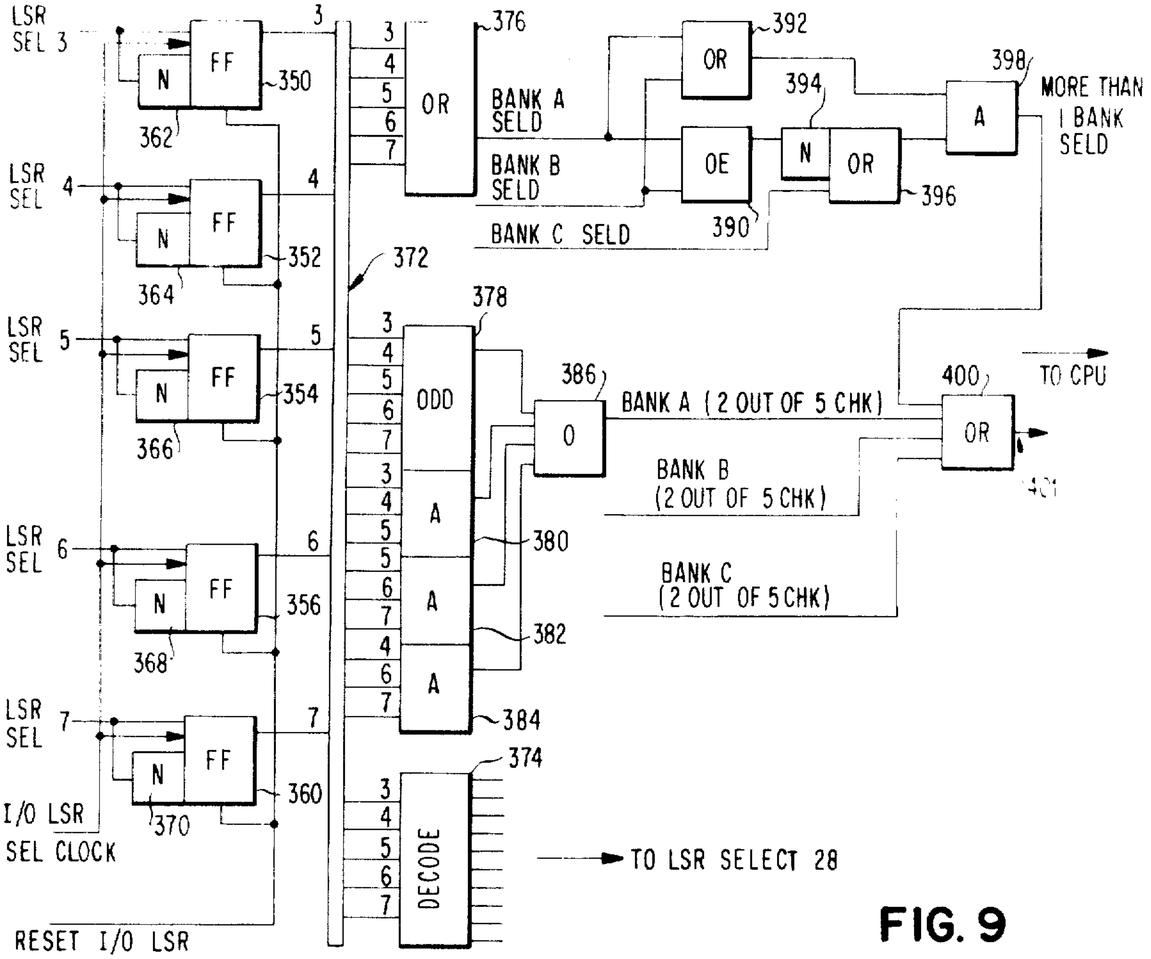
FIG. 7 is a chart showing the conditions of the logic of FIG. 6 for a hierarchy of priorities in requesting I/O cycles.
FIG. 9 is a diagram of the local store register selection logic contained in the channel.

The REQUEST BUS IN 74 and its associated logic 108 is used by the I/O attachments to request an I/O cycle from the CPU for the purpose of accessing the main storage 32. The bus 74 and logic 108 are shown in FIG. 6. The bus consists of five lines labeled CYCLE STEAL REQ 3 through 7. However, the indication of five lines and the corresponding logic is not intended to be limiting. Additional lines may be used and logic coupled thereto in the manner described thereby accommodating additional priority requests. Each line, together with a clock time, defines a unique request. Each request is assigned a priority, establishing a 20-position hierarchy of priority requests. In a preferred embodiment of the invention, four sample times are used corresponding to the leading edges of clocks 1, 3, 5 and 7 of FIG. 3. A 20-position hierarchy of priority requests is shown in FIG. 7 along with the corresponding status of the cycle steal request lines and the clock times. The listing of a line in FIG. 7 indicates that a request appears on that line. Thus, priority one is indicated by having a request on CYCLE STEAL REQ. line 3 at the leading edge of clock 7.

Attachments which have cycle steal capabilities are assigned to one of the priority request positions. Thus, with reference to FIG. 7, I/O attachment A will have top priority while I/O attachment T has the lowest priority. In order for an I/O attachment to request a cycle steal, the attachment must have its designated cycle steal request line raised during the designated sample time. In a manner to be described, the CPU then stores the cycle steal request.

Using the cycle of FIG. 3 at clock 7D a priority assignment code indicating which I/O attachment is to receive the next cycle is placed on the DBO 72 by raising line 229. This code remains on DBO 72 until line 229 is disabled. In the specific example previously cited this occurs at clock 0C.

Circuitry for accomplishing the priority request function is shown in detail at FIG. 6. Operation of this circuitry will now be described. As is evident from FIG. 7 the priority of an I/O attachment is dependent upon the CYCLE STEAL REQ line to which it is attached and on the clock times. The CYCLE STEAL REQ lines are sampled four times during a cycle. This occurs at the leading edge of clocks 1, 3, 5 and 7. At each of the four times the I/O attachments may request an I/O cycle. Time priority recognition is accomplished through the latches 270–276 and their associated gating circuitry. Line priority recognition is accomplished through the use of flip-flops 290–296 and their associated circuitry.

The logic for the priority request includes an OR gate 252 having the CYCLE STEAL REQ lines 3–7 as inputs. The output of OR gate 252 is applied to a polarity hold circuit 254, which in turn is coupled to latches 270 through 276. The state of the outputs of latches 270 through 276 represents the first four bits of the code indicating the attachment to be granted the next cycle steal. The outputs of these latches are fed to the bus 227 (FIG. 5) which, in a manner previously described, alerts the I/O attachments.

The cycle steal request lines are also coupled respectively to the flip-flops 290–296. The outputs of the flip-flops are transferred to bus 227 and represent the remaining five bits of the code.

In order to more fully understand the operation of the request logic, the following examples are given.

Assume that CYCLE STEAL REQ line 7 is at a logic 1, while the remaining lines are at logic 0. The state of the line 7 is fed through OR gate 252 to one input of the polarity hold 254. On the appearance of the first odd clock, polarity hold 254 is set, thereby enabling AND gates 256 through 264. The AND gates 256 through 262 condition latches 270 through 276, respectively, to remember the time at which one or more bits appeared on the CYCLE STEAL REQ lines 3–7, causing polarity hold 254 to be set. For example, if polarity hold 254 is set at the leading edge of clock 1, latch 276 will be set through its AND gate 262. Similarly, if the polarity hold was set at the leading edge of clock 3, then latch 274 will be set through its AND gate 260. On the occurrence of each even clock, polarity hold 254 will be reset in a manner well known in the art. If a different cycle steal request line is activated at the leading edge of another odd clock, e.g., clock 3, then polarity hold 254 is set and the latch 274 corresponding to the clock time 3 is set.

Assume that during clock time 1 latch 276 has been set, and that at clock time 3 latch 274 is set. The setting of latch 274 causes the previously set latch 276 to be reset. The means for accomplishing this comprises OR gate 284 which is coupled to the output of the set side of latch 274. The output of gate 284 being coupled to the reset terminal of latch 276 causes latch 276 to be reset upon the setting of latch 274. In a similar manner, the setting of latch 272 or 270 will reset any lower latch. Thus, during a machine cycle, only the highest clock time during which a cycle steal request appeared on one of the request lines will be stored. After an attachment has been selected and it has been so informed the latches and flip-flops of the selection logic must be reset. This is accomplished by a reset pulse on line 307. In FIG. 6 the pulse is indicated as occurring at clock 0D. This corresponds to the next phase time after line 229 has been disabled. Since in the previous example this occurred at time 0C, line 307 would be activated at time 0D.

Flip-flops 290 through 298 act as a means to remember which of the cycle steal request lines is raised to a logic 1 at the leading edge of each of the odd clock times. During each odd clock, if any of the cycle steal request lines is at a logic 1, AND gate 264 is enabled by polarity hold 254, and acts to allow a triggering pulse in the form of clock pulse to load the flip-flops 290 through 298 which are presented with a cycle steal request on their corresponding cycle steal request line. As is obvious, if no requests appear on any of the request lines, the state of the flip-flops remain unchanged.

Operation of these flip-flops in relation to the cycle steal requests is as follows. If it is assumed that at the rise of clock 1, CYCLE STEAL REQ line 3 is at a logic 1, the set side of flip-flop 290 is triggered to a logic 1. The output of the flip-flop 290, besides being coupled to PRIORITY BUS 227, is also coupled to OR gate 310. The output of OR gate 310 is coupled to the reset terminal of flip-flop 292 and also to one input of OR gate 312. The output 312 is coupled to the reset terminal of flip-flop 294 and to one input of OR gate 314. Similarly, the output of gate 316 is coupled to the reset terminal of flip-flop 298. Thus, the raising of the set side of flip-flop 290 to a logic 1 enables OR gate 310 which will reset flip-flop 292 and through OR gates 312, 314 and 316 will reset flip-flops 294 through 298, respectively. Therefore, if at the rise of clock 1, CYCLE STEAL REQ lines 3, 4, 5, 6, and 7 are all at a logic 1, only flip-flop 290 will remain set at the end of clock time 1. Similarly, if cycle steal request lines 4 and 7 were at a logic 1 at the leading edge of clock time 1, at the end of that clock time, only flip-flop 292 would remain in its set condition.

The manner of developing the hierarchy of priority requests now becomes clear. By scanning bus 227 after clock 7, the highest priority input/output attachment which, during that machine cycle, requested an input/output cycle, is so notified by the condition of the lines of bus 227. The conditions of these lines is fed through the AND gate 228 of FIG. 5 to the DBO 72 and then to the I/O attachments.

Figures 8, 10:
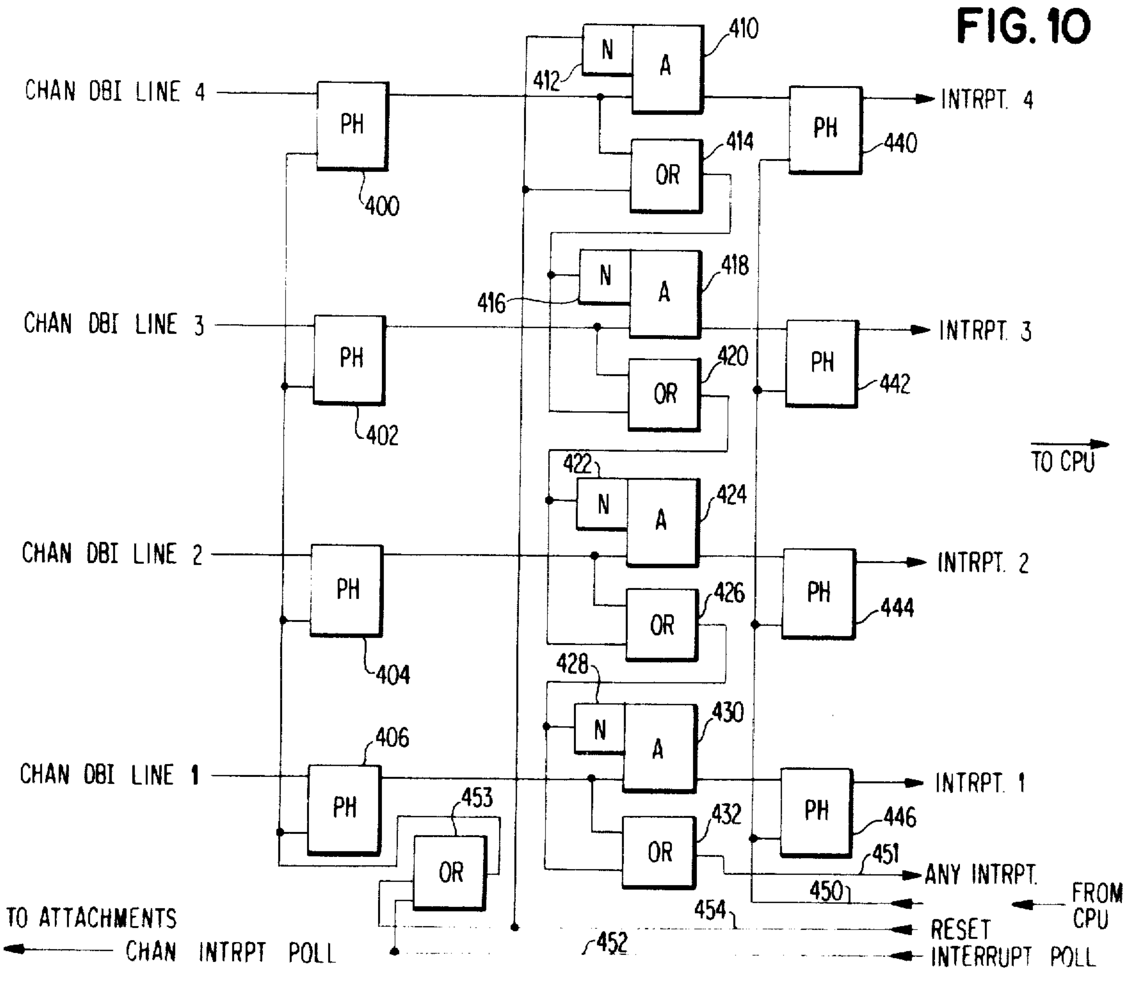
FIG. 8 shows the conditions on the data bus out for indicating the priorities listed in FIG. 7.
FIG. 10 shows the logic for accomplishing interrupt requests in accordance with a preassigned priority.

FIG. 8 shows the states of the DBO 72 for each of the 20 I/O attachment assignments.

It should be noted that the output of the set side of latch 270 is coupled through an inverter 279 to the bus 227. By reason of this inverter, each time the set side of latch 270 is at a logic 1, its corresponding line on bus 227 appears as a logic 0. The reason for this is so that odd parity will be presented on DBO 72.

If any I/O attachment has made a request for a cycle steal during a machine cycle, then at clock 7 the output of OR gate 320 would be conditioned, which, in turn, activates line 321 which is terminated in the CPU. Activation of this line indicates to the CPU that a cycle steal has been requested. The CPU will then grant its next cycle to the I/O attachment. Such operation of the CPU is not part of this invention and indeed well known in the art and further a description thereof is not necessary for an understanding of this invention.

LSR SELECTION LOGIC

As previously explained, the address registers for accessing the main storage 32 wherein there is stored the data and instructions for carrying out an I/O cycle may be contained in the CPU in a group of local store registers (LSR) 26. In such a case, on the granting of an I/O cycle to an I/O attachment it becomes necessary for the attachment to select the proper register or registers during this cycle. Such selection is accomplished through a unique local store register select logic network 110 contained within the I/O channel.

The operation of this circuitry in response to an I/O attachment signals will now be given with reference to FIG. 9.

Each SELECT BUS IN 76 corresponds to the five lines designated LSR SEL 3 through 7. Three sets of these lines pass through the channel, one for each bank. However, since each set is identical, only one is shown. The logic circuitry coupled to lines LSR SEL 3–7 represent SELECT logic circuitry 110 for one bank only, namely bank A. Similar logic circuitry is necessary for the I/O attachments coupled to banks B and C.

Broadly, the SELECT logic 110 provides a 2 out of 5 code for selecting the proper register in the LSR 26 and in addition provides check means to disable the selection of a register in the CPU if other than a 2 out of 5 code encountered. Thus, only two combinations are permitted, no lines being raised to a logic 1 or two lines in one bank being raised. If any other combination is present, line 401 which terminates in the CPU raises to a logic 1. The CPU contains means, not a part of this invention which, responsive to the raising of line 401, stops the selection of an LSR register.

Each of the LSR SEL lines 3 through 7 is connected to one of the flip-flops 350 through 360, respectively. These flip-flops, acting as triggers are set by an I/O LSR select clock, thereby transferring the information on the LSR select lines to the flip-flops. The I/O LSR select clock is simply the master clock contained in the CPU gated into the LSR select logic at selected times. In the preferred embodiment of the invention, these times appear at clocks 0A, 1, 3, 5 and 7 of the machine cycle shown in FIG. 3. In a manner well known, the outputs of the set side of each of the flip-flops 350 through 360 are transferred via bus 372 to the decoder 374. The output of the decoder indicates the one register in the LSR 26 selected at a particular clock time. Inverters 362 through 370 are used to give opposite polarity to the reset side of the flip-flops 350-360 to cause them to reset on a trigger pulse when its corresponding LSR SEL line is at a logic 0.

The decoder 374, which is well known in the art, uses a 2 out of 5 code to select one of 10 registers in the LSR 26.

To check that only a 2 out of 5 code is on bus 372, unique checking circuits are included in the channel. The operation of these checking circuits are as follows:

The 2 out of 5 check is performed by logic blocks 378, 380, 382 and 384. Logic block 378 receives its inputs from the outputs of the set sides of flip-flops 350 through 360 and determines, whether an odd number of them has been set. Such a circuit is well known in the art and a further description thereof unnecessary. The input to AND gate 380 is coupled to flip-flops 350, 352 and 354. Thus, a logic 1 at the outputs of gate 380 indicates that all three of these flip-flops are in a set condition. Similarly, AND gate 382 indicates when flip-flops 354, 356, and 360 are all in a set condition while AND gate 384 indicates when the flip-flops 352, 356 and 360 are all in their set conditions. The outputs of each of these checking circuits is coupled through OR gate 386 to OR gate 400. It now becomes apparent that if any of the 2 out of 5 check circuits 378 through 384 indicates a logic 1 at its output, a 2 out of 5 code is not being stored in flip-flops 350 through 360 and the selection of a local store register must be terminated. This is accomplished by raising line 401 which is terminated in the CPU. The 2 out of 5 check logic just described is identical for the LSR selection logic circuitry used with the other two banks.

During any clock time, it is essential that only one local store register be selected to address the main storage. It is possible that even with a 2 out of 5 code in bank 1 checked, more than one register will be chosen if two banks are sending out a 2 out of 5 code at the same time. To check this condition, additional logic circuitry is contained within the LSR selection logic of the I/O channel of the invention.

OR circuit 376 is used to indicate that at least one of the LSR SEL lines in bank A has been raised to a logic 1. Each of the other two banks contain an OR gate 376. The output of OR gate 376 of bank A is connected to the inputs of OR gate 392 and exclusive OR 390. The output of the corresponding OR gate 376 in bank B (not shown) is coupled through BANK B SELD line to a second input of OR gate 392 and the exclusive OR 390. Assuming that both the BANK A SELD line and the BANK B SELD line are raised, the output of OR gate 392 is raised while the output of the exclusive OR 390 remains at a logic 0. The output of the exclusive OR 390 is coupled to one input of OR gate 396 through inverter 394. Therefore, the logic 0 output from gate 390 conditions gate 396, thereby enabling AND gate 398. This raises the output of AND gate 398, which conditions OR gate 400, thereby stopping the selection of a register in the LSR's 26.

In a manner which is now evident to those skilled in the art, if banks B and C have an LSR SEL line raised, AND gate 398 will be conditioned raising line 401. Similarly, should banks A and C have an LSR SEL line raised, AND gate 398 will be conditioned, raising to a logic 1 line 401, causing the selection of a register in the LSR 26 to be terminated.

It should be pointed out that while the majority of the logic circuitry contained in the SELECT logic 110 is duplicated for each bank, the logic circuitry comprising OR gates 392, 396, and 400 as well as the exclusive OR gate 390 and AND gate 398, are common to banks A, B, and C.

Selection of a local store register upon the occurrence of a proper 2 out of 5 code decoded in decoder 374 occurs in the CPU in a manner well known in the art through the use of selection circuitry 28 of FIG. 2.

CHANNEL INTERRUPT LOGIC

Some attachments perform functions such that when a program service is required, it is required within milliseconds. For alerting the program of these needs, the channel provides an interrupt capability. This interrupt logic is shown generally at 104 in FIG. 2 and specifically in FIG. 10. With reference to FIG. 2, when an interrupt request occurs on DBI 70, the INTERRUPT logic 104 sends a signal to the LSR selection circuitry 28 in the CPU which in turn selects registers in the local store registers 26 specifically assigned for the interrupting operation. These registers serve as the address registers for the instructions in the program's interrupt routine.

Each attachment which requires an interrupt capability is assigned one of the DBI 70 lines as well as a position in a priority of interrupts. Selection of an attachment requiring an interrupt on the basis of its priority is accomplished through the use of the INTERRUPT logic 104 of the I/O channel.

An interrupt request is received when the channel INTERRUPT POLL line 452 is raised. The raising of line 452 is under control of the CPU and not a part of this invention. When used with the CPU previously described, acting under the machine cycle of FIG. 3, line 452 is active during clocks 5 through 7 of the last machine cycle of every program instruction. It is used to alert the attachments that the CPU is ready to accept interrupt requests. The start of the request for an interrupt is determined by the attachment and is a result of being enabled by a program. The purpose of the INTERRUPT logic is to assign an interrupt to only one attachment if more than one requires an interrupt during any one cycle.

Operation of the INTERRUPT logic will now be described. Four lines of DBI 70 are shown and they are labeled as Channel DBI 1, 2, 3, and 4. It is understood that the actual number of lines may equal the number of lines which comprise DBI 70. Each of these serves as one input to polarity holds 400, 402, 404 and 406, respectively. The second input to each of the polarity holds 400–406 is from the channel INTERRUPT POLL line previously described or a system reset line 454 terminated at its other end in the CPU. This line is activated on a system reset instruction in a manner well known. The output of each of the polarity holds is fed to logic circuitry consisting of an AND gate, an OR gate, and an inverter. Specifically, the output of the set side of polarity hold 400 appears as one input to AND gate 410. The second input to gate 410 is from the system reset line 454 through inverter 412. This line is normally at a logic 0. A similar circuit is coupled to the outputs of the other polarity holds 402, 404 and 406 respectively and operate in an identical manner. The output of the AND gates 410, 418, 424, and 430 appear as one input to polarity holds 440, 442, 444 and 446 respectively. The output at the set side of these polarity holds appear as the inputs to the LSR selection logic 28 in the CPU during an interrupt. The manner in which they operate in the CPU is not a portion of this invention.

Assume that polarity hold 440 is set by the setting of the polarity hold 400 and a clock pulse on line 450. Simultaneously, the output of OR gate 414 is raised to a logic 1 which blocks AND gate 418. The output of OR gate 414 is also coupled to one input of OR gate 420 whose output, when raised to a logic 1, blocks AND gate 424. In a similar manner, AND gate 430 is blocked when the output of OR gate 426 is raised to a logic 1. Thus, the setting of polarity hold 400 enables AND gate 410 and disables AND gates 418, 424, and 430. Therefore, if CHAN DBI 1–4 were all activated during the enabling of line 452 only polarity hold 440 would remain set. It now becomes clear that should CHAN DBI line 3 be raised while 2 and 1 are also raised and 4 is not raised, only INTERRUPT line 3 would be raised to its logic 1 state.

Polarity holds 440, 442, 444 and 446 store the interrupt priority request received at the polling time until the next poll time. At this time, the polarity holds 440–446 are reset by a signal from the CPU on line 450.

The outputs of polarity holds 440, 442, 444 and 446 as well as the ANY interrupt line 451 go to the CPU's selection circuit 28 and there select the particular registers associated with the particular interrupt request. In this way the main storage 32 is addressed at the correct location to get the instruction for the particular interrupt level required.

While the invention has been particularly shown and described with reference to a preferred embodiment thereof, it will be understood by those skilled in the art that various changes in form and details may be made therein without departing from the spirit and scope of the invention.

What is claimed is:

1. An input/output channel for providing a path for the transfer of information directly between a plurality of input/output attachments and a central processing unit and through the central processing unit to a main storage, said central processing unit being capable of operating on data from said attachments, said channel comprising, a first means for transmitting data from said attachments to said central processing unit, a second means for transmitting data from said central processing unit to said attachments, said first means including a first translator, for altering the data from said attachments to a form recognizable by said central processing unit, said second means including a second translator for altering the data from said central processing unit to a form recognizable by said attachments, and first and second logic means associated respectively with said first and second transmitting means for selectively causing data passing through the channel to either pass through said translators or bypass said translators if the data does not need to be translated.

2. A channel as claimed in claim 1 further including;

means for receiving time-dependent requests from said attachments for use of said central processing unit, means for determining which of said attachments requesting the use of said central processing unit has the highest priority among a preassigned set of time-dependent priorities, and means, for granting use of said central processing unit to the one of said plurality of attachments requesting said use which has the highest priority of the requesting attachments.

3. An input/output channel for providing a path for the transfer of information between a plurality of input/output attachments, and a central processing unit and a main storage, wherein said central processing unit includes a plurality of registers, a portion of said registers being address registers for said attachments, comprising;

selection means under the control of said attachments for selecting in response to a selection signal from an attachment granted a cycle steal the one of said address registers corresponding to the attachment granted a cycle steal by the central processing unit, there being preassigned to each attachment one of said address registers, said selection signal being used to identify one of said address registers, said selection means including checking means for checking that only one address register is selected and for disabling said selection means if more than one register is selected.

4. A channel as claimed in claim 3 further including interrupt means, for requesting an interrupt cycle from said central processing unit on command of an attachment, said interrupt means including interrupt priority logic means for passing to said address registers only the one interrupt request which is the highest among a preassigned hierarchy of priorities.

5. An input/output channel providing a path for the transfer of information directly between a plurality of input/output attachments and a central processing unit and through the central processing unit to a main storage, said central processing unit including at least one group of registers, said channel comprising;

means for carrying information from said attachments to said central processing unit, means for carrying information from said central processing unit to said attachments, a plurality of cycle steal request lines, each line being assignable to a plurality of attachments, time dependent priority means for controlling the order, according to a preassigned hierarchy, in which said attachments are granted central processing unit produced cycle steals, a single request thereby being assignable to a plurality of attachments, and means including said means for carrying information from said central processing unit for indicating to said attachments the one attachment granted a cycle steal.

6. A channel as claimed in claim 5 further including;

selection means under the control of said attachment for selecting a preassigned one of said group of registers in said unit, said preassigned register having been preassigned to the attachment granted a cycle steal, in response to a selection signal from the attachment granted a cycle steal, said selection means including a means for checking that only one of said group of registers is selected at a time.

7. A channel as claimed in claim 6 wherein;

said means for transmitting information from said attachments includes first translator means for making the information transferred from said attachments compatible with said central processing unit, and said means for transmitting information from said central processing unit includes second translator means for making the information transferred from said central processing unit compatible with said attachments.

8. A channel as claimed in claim 7 further including interrupt means for controlling the selection of one of said group of registers in response to a plurality of interrupt requests from said attachments, said selection being based upon a preassigned hierarchy of priorities.

9. An input/output channel providing a path for the transfer of information between a plurality of input/output attachments and a central processing unit and through the central processing unit to a main storage, wherein said unit includes a group of local store registers and has the capability of granting a cycle steal comprising;

a first means for transferring information from said attachments to said unit, said first means including, first translator means for translating data into a code recognizable by said central processing unit, and first logic means for selectively causing data to bypass said first translator means, second means for providing a path for the transfer of data from said unit to said attachments, said second means including second translator means for translating data into a code recognizable by said attachments, and second logic means for selectively causing data to bypass said second translator means, request means for selectively granting a cycle steal to one of a plurality of attachments simultaneously requesting a cycle steal, said selective granting being on the basis of a time dependent preassigned priority, means, coupled between said request means and said second means, for transferring to said second means a signal identifying the attachment granted a cycle steal, selection means, under the control of the attachments, for selecting one of said local store registers in said central processing unit, said register containing an address in said storage wherein is stored an instruction or data required by one of said attachments, said selection means further including checking means for checking that a single register is selected at any point in time and for indicating when more than one register is selected, and interrupt means, responsive to interrupt requests from said attachments for granting an interrupt cycle to only one of said attachments in accordance with a preassigned priority.

10. The input/output channel as claimed in claim 11 wherein said attachments are arranged in a plurality of groups each attachment in a group being coupled to said channel through a common bank of lines, said channel further including a plurality of SELECT buses each associated with a different bank of lines, said selection means being comprised of a plurality of SELECT logic circuits one associated with each SELECT bus and means responsive to the output of said SELECT logic circuits for disabling the selection means when more than one of said SELECT logic circuits designates a local store register.

* * * * *